United States Patent [19]

Kopich

[11] Patent Number: 4,925,164
[45] Date of Patent: May 15, 1990

[54] COIL SPRING WITH GUIDE ROLLERS

[75] Inventor: Leonard F. Kopich, Madison Heights, Mich.

[73] Assignee: General Motors Corporation, Detroit, Mich.

[21] Appl. No.: 776,612

[22] Filed: Sep. 16, 1985

[51] Int. Cl.⁵ .................... F16F 1/06; F16F 9/00
[52] U.S. Cl. .................... 267/167; 267/74; 267/286; 267/275; 384/52
[58] Field of Search .............. 267/80, 90, 34, 148, 267/149, 166, 167, 180, 174, 73, 74, 155, 157, 331, 275, 286; 308/3 R, 4 R; 384/37, 32, 43, 142, 52, 58; 92/178

[56] References Cited

U.S. PATENT DOCUMENTS

| | | | |
|---|---|---|---|
| 2,549,356 | 4/1951 | Zalkind | 384/58 X |
| 3,190,633 | 6/1965 | Jack | 267/167 |
| 3,347,603 | 10/1967 | Ignatjev | 384/58 X |
| 3,398,653 | 8/1968 | Foster | 92/178 |
| 3,582,059 | 6/1971 | Van Ooy | 267/34 |
| 3,910,566 | 10/1975 | Pedersen et al. | 267/167 |

FOREIGN PATENT DOCUMENTS

| | | | |
|---|---|---|---|
| 0451033 | 10/1927 | Fed. Rep. of Germany | 92/178 |
| 1108959 | 1/1956 | France | 308/3 R |

*Primary Examiner*—Robert J. Oberleitner
*Attorney, Agent, or Firm*—D. D. McGraw

[57] ABSTRACT

A coil spring has a series of short length plastic rollers received on the spring coils so that the rollers engage either a cylinder wall in which the spring works or a rod received through the spring, or both. The rollers act as roller bearings to prevent binding, wear and noise.

10 Claims, 1 Drawing Sheet

COIL SPRING WITH GUIDE ROLLERS

The invention relates to a spring which has a series of rollers received about at least portions of the spring so that the rollers roll on the spring portions and also are engageable with a cooperating surface area to roll on that surface area as well as the spring is flexed. The surface area, may for example, be the cylinder wall of a bore in which the spring is positioned, or may be the exterior surface of a rod about which the spring is placed.

In the preferred embodiments illustrated, the spring is a coil spring having a plurality of coils. A series of rollers with axially extending passages formed therethrough are received on at least some of the plurality of spring coils so that the rollers will roll on the spring coils as the spring is compressed or extended. The rollers will also engage a spring guide surface area and roll relative to it, such a surface area being the cylinder wall of a bore or a rod which guides the spring. The rollers may have an externally crowned construction with axially extending passages therethrough to receive the spring. The rollers may be internally crowned to facilitate their rolling on curvilinear spring segments as well as their being able to more easily adapt to a curvilinear surface area which guides the spring. The rollers may be crowned internally and externally. Rollers may be separated by spacers which are generally similar to the rollers but of smaller outer diameter so that the spacers do not normally engage the guide surface area.

The rollers are typically assembled in a bead-like threaded manner on the spring. It is preferable that the spring be made from wire or the like so as to have a circular cross-section which lets the rollers roll with less friction on the spring.

In a typical coil spring operating in tension or in compression or in torsion or a combination thereof, the rollers will decrease friction between the spring and the guide surface area or areas that may come in contact with the spring. While the invention is illustrated as involving coil springs, it is also applicable to other types of springs such as wavy springs or bow springs, and other springs which in their normal operation have at least portions moving relative to a surface guide area.

Figure 1:
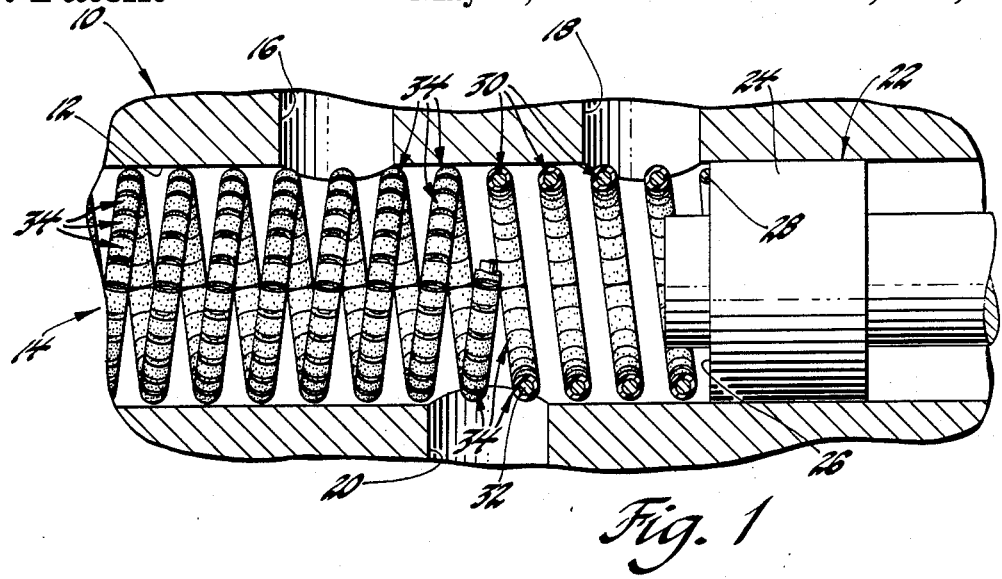
FIG. 1 is a fragmentary view of a spring embodying the invention with the spring being positioned in a bore and acting on a valve or piston. Parts are broken away and in section.

A body 10 is schematically illustrated in FIG. 1 as providing a cylinder or bore 12 which acts as a surface guide for the spring assembly 14 embodying the invention. Spring assembly 14 is illustrated as being a coil compression spring. It is to be understood, however, that the invention may be used with other types of springs. Also, the coil spring may be a tension spring or may be a spring which exerts a torsion force, or a combination of compression, tension and/or torsion forces. Body 10 is illustrated as having ports 16, 18 and 20 intersecting the bore 12 at axially spaced points along the bore. A valve or piston 22 is schematically illustrated as being reciprocably received in bore 12. Piston 22 is shown as having a land 24, the outer end 26 of which provides a spring seat for the spring assembly end 28 extending annularly about a reduced diameter piston end. The other end of the spring assembly 14 is not illustrated, but is understood to be acting on another surface.

Spring assembly 14 is illustrated as a coil spring having a series of spring coils 30. The spring coils are also illustrated as being made of a wire 32 or the like so that each of the coils has a circular cross-section. Therefore at least a part of each coil provides a circular cross-section segment. The spring assembly 14 has a plurality of cylinder-like rollers 34 threaded thereon in a bead-like manner. While all of the spring coils 30 except the end coil portion adjacent spring end 28 are illustrated as having rollers 34 thereon, it is to be understood that it is not necessary to provide rollers throughout all of the coils of the wire 32 forming the spring coils 30. In some instances only certain ones of the coil may be provided with rollers 34.

Figure 2:
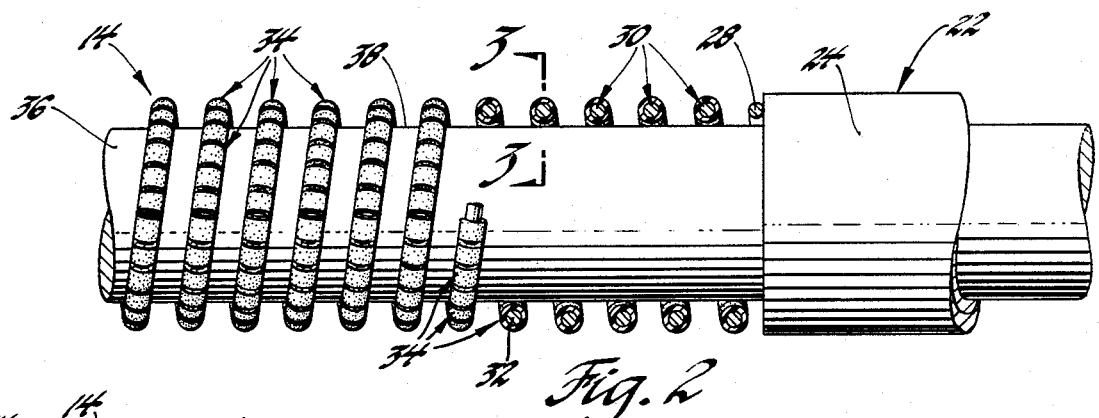
FIG. 2 is an elevation view of a spring embodying the invention and installed about a rod. Parts are broken away and in section.

FIG. 2 shows the same spring assembly 14 as that illustrated in FIG. 1. In this instance the valve or piston 22 has a reduced diameter extension or rod 36 which extends through at least some of the spring coils 30, and may extend through all of the spring coils. Therefore the rod outer peripheral surface 38 acts as a guide surface area for the spring assembly 14 and is located on the inner periphery of the spring assembly. It is to be understood that the rod arrangement of the valve and piston 22 may be used in a bore such as bore 12 of a body 10 so that the spring assembly is positioned in an annular space between the rod surface 38 and the bore surface 12, if desired.

Figure 3:
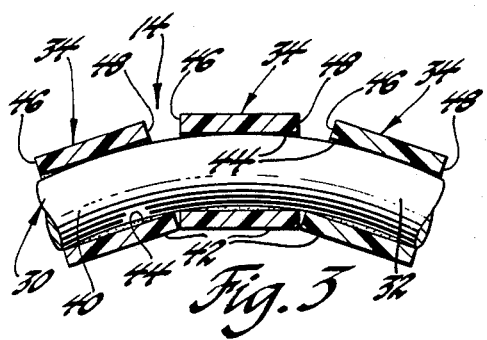
FIG. 3 is a fragmentary cross-section view of the spring of FIG. 1 or FIG. 2, taken in the direction of arrows 3—3 of FIG. 2 and having parts broken away.

FIG. 3 shows a detail of the construction and arrangement of a curvilinear fragment of one of the spring coils 30 and shows the rollers of spring assembly 14 in greater detail. The segment of the spring coil 30 illustrated in greater detail has a surface 40 on which the rollers 34 are received. Each roller 34 is a hollow cylinder with an outer surface 42, and inner surface 44 and end surfaces 46 and 48. The particular rollers illustrated in FIGS. 1, 2 and 3 are straight cylinders wherein the outer surface 42 and the inner surface 44 are parallel and the end surfaces 46 and 48 are perpendicular to those surfaces and therefore parallel to each other. The rollers are preferably made of a plastic material such as nylon or another suitable polyamid, for example.

The inner surface 44 of each roller 34 defines an axially extending passage through the roller which has a diameter somewhat greater than the diameter of the wire 32 from which the coil 30 is made. The rollers extend around a relatively short arc of a coil in relation to the diameter of the coil. Thus there are several rollers on one coil 30 as shown in FIGS. 1 and 2. Due to the arcuate nature of the portion of the coil extending through each roller 34, the roller bore or passage defined by inner surface 44 must be sufficiently large in diameter to accomodate this arc. As seen in FIG. 3, for example, the outer periphery of spring coil 30 is immediately adjacent the center of the inner surface 44 of roller 34, and the inner periphery of the coil is immediately adjacent the opposite ends of the roller passage or bore formed by inner surface 44. It is desirable that the rollers be freely rotatable on the spring coils and therefore the rollers and the spring coils are so proportioned that the arc of the coil received through the rollers in relation to the diameter of the coil, the diameter of the roller passage, and the diameter of the wire from which the coil is made permit the rollers to be freely rotatable on the coil. The rollers in effect extend chordally along the coil arcs contained within the rollers. Therefore adjacent ends of a pair of rollers have their radially outward portions arcuately spaced apart while their radially inner portions may be closely adjacent to each other or even in light contact. However, it is important that the rollers not be so packed on the coils that there is axial force exerted between rollers which would tend to inhibit free rotation of the rollers.

Figure 4:
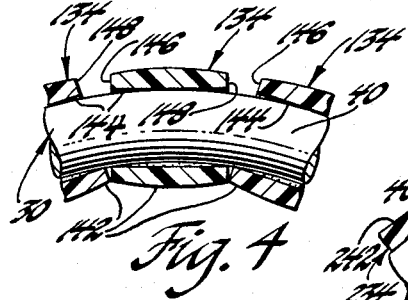
FIG. 4 is similar to FIG. 3 and shows a modification of the roller mechanism.

FIG. 4 shows a modified roller construction. The rollers 134 have their outer surfaces 142 formed so as to be externally crowned. Therefore the maximum diameter of each roller outer surface is located intermediate the roller end surfaces 146 and 148 and is greater than the diameter of the roller at its end surfaces. It is preferred that the arc of the crown of the outer surface 142 be at least as curved as the arc of the bore 12 in which the spring assembly having the externally crowned rollers is received, it being further preferable that the crowned arc is based on a smaller radius than the radius of the bore 12 so that there tends to be a rolling line contact between the crowned outer surface 142 of each roller 134 with the surface area of the bore 12. In the roller 134 illustrated in FIG. 4, the inner surface 144 remains as an axially extending right cylinder surface as is the inner surface of each roller 34 in FIG. 3.

Figure 5:
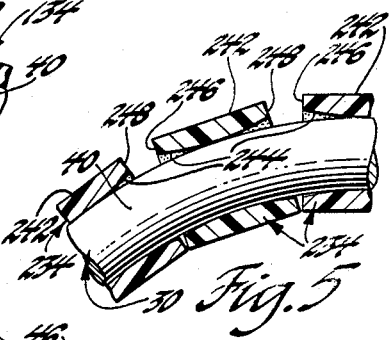
FIG. 5 is a view similar to FIG. 3 and showing another roller modification.

FIG. 5 shows rollers 234 in which the outer surface 242 remains that of a right cylindrical surface, but the inner surface 244 is crowned. The arc of the crowned inner surface should be no less curved than the arc of the coil 30 at its inner periphery and may be somewhat smaller radius than that arc. When the radius of the arc of the crowned inner surface 244 is substantially the same as the radius of the arc of the inner periphery of the spring coil 30, there is surface rolling engagement of the roller inner surface 244 with the inner periphery of the coil 30 and substantially line engagement at the outer periphery of the spring coil 30. The outer surface 242 of the rollers will tend to engage the surface area of bore 12 at the corners formed by that outer surface and each of the roller end surfaces 246 and 248, in the same manner that the rollers 34 of FIGS. 1 and 3 engage the surface area of the bore 12.

Figure 6:
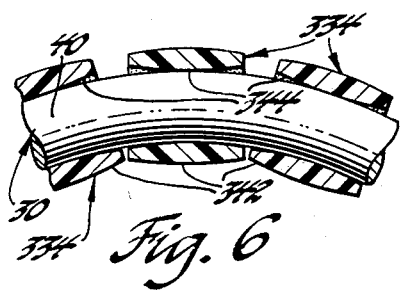
FIG. 6 is a view similar to FIG. 3 and showing still another roller modification.

FIG. 6 shows double crowned rollers 334, with the outer surfaces 342 and the inner surfaces 344 being crowned. This is essentially a combination of the construction of FIGS. 4 and 5.

Figure 7:
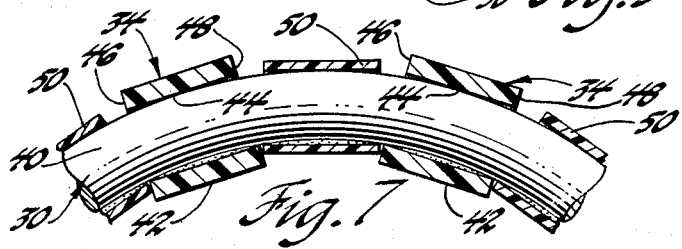
FIG. 7 is a view similar to FIG. 3 and showing yet another roller arrangement.

FIG. 7 shows a modified arrangement wherein adjacent rollers 34 are spaced apart by means of spacers 50. Spacers 50 are illustrated in FIG. 7 as being constructed in the same manner as rollers 34, that is, being tubular segments of nylon or the like, but having a smaller outer diameter. By this arrangment the rollers 50 will not engage the surface area of bore 12 when the spring assembly is installed in that bore, nor will they engage the surface 38 of rod 36 when installed over such a rod. This will decrease the number of rollers which actually engage the guide surface area or areas and therefore tend to further decrease the friction between the rollers and the surface area or areas. This arrangement will also provide for additional fluid flow past the coils if such is necessary or desirable. It is to be understood that any of the rollers of FIGS. 3, 4, 5 and 6 may be used in the manner illustrated in FIG. 7, and that the spacers may be of any suitable shape. The spacers 50 may or may not be arranged to rotate on the spring coils. For example, the spacers may be made of curvilinear tubes adapted to the same arcuate curve of that of each coil so that they tend to remain in position on the coil. They may be made of linear tube segments which deform to the coil curve when installed. Spacers of this type may be used to retain rollers in position on some spring coils when less than all of the spring coils are provided with rollers.

When the spring assembly 14 is subjected to either compression, tension or torsion or any combination of such forces, the coils tend to move relative to the guide surface area 14 or 38, or both depending upon the installation. The rollers guide the spring relative to the appropriate surface area and decrease the friction between the spring and that surface area upon such relative movement. The rollers will also prevent binding and scouring of the surface guide area. This is particularly important when a long spring is put under compression in a guiding bore. The rollers will also tend to minimize spring squeaking or similar noises which may occur as the spring is flexed.

The embodiments of the invention in which an exclusive property or privilege is claimed are defined as follows:

1. A coil spring having a plurality of coils and a series of crowned rollers having axially extending passages therethrough and received on at least some of said plurality of spring coils, said rollers being individually freely rotatable on said spring and adapted to rollingly engage a spring guide surface area.

2. A coil spring having a plurality of coils and a series of externally crowned rollers having axially extending passages therethrough and received on at least some of said plurality of spring coils, said rollers being individually freely rotatable on said spring and adapted to rollingly engage a spring guide surface area.

3. A coil spring having a plurality of coils and a series of rollers and spacers having axially extending passages therethrough and received in alternatively spaced relation on at least some of said plurality of spring coils, said rollers being individually freely rotatable on said spring and adapted to rollingly engage a spring guide surface area, said spacers being of lesser maximum diameter than said rollers and keeping said rollers spaced apart on said spring coils.

4. A movable spring segment having a circular cross-section, a series of bead-like rollers having cylindrical outer surfaces, opposite end surfaces and bores therethrough and receiving said movable spring segment therethrough so that said rollers may individually freely rotate on said spring segment, the outer surfaces of said rollers being adapted to engage a surface area positioned immediately adjacent said spring segment to guide said spring segment relative to said surface area and to decrease friction between said spring segment and the surface area upon relative movement therebetween, each of said roller cylindrical outer surfaces being crowned so that its maximum diameter is located intermediate said roller end surfaces and is greater than the diameter of said roller at its said end surfaces.

5. A coil spring adapted to be loaded in at least one of tension, compression and torsion load modes and having a series of coils arranged about a spring axis, said spring being formed from wire or the like so as to have a circular cross-section, a series of internally crowned rollers formed with passages extending centrally therethrough and having outer cylindrical surfaces and end surfaces, said series of rollers receiving said series of spring coils therethrough in a bead-like threaded manner, each of said rollers extending around a sufficiently short arc of a coil in relation to the diameter of the coil and the diameter of the roller passage through which the coil extends that said rollers are individually freely rotatable on said spring coils.

6. A coil spring adapted to be loaded in at least one of tension, compression and torsion load modes and having a series of coils arranged about a spring axis, said spring being formed from wire or the like so as to have a circular cross-section, a series of rollers formed with internally crowned passages extending centrally therethrough and having outer cylindrical surfaces and end surfaces, said series of rollers receiving said series of spring coils therethrough in a bead-like threaded manner, each of said rollers extending around a sufficiently short arc of a coil in relation to the diameter of the coil and the diameter of the roller passage through which the coil extends that said rollers are individually freely rotatable on said spring coils, said rollers having their end surfaces which are adjacent to another roller end surface is normally in slightly spaced relation but engageable therewith.

7. A coil spring adapted to be loaded in at least one of tension, compression and torsion load modes and having a series of coils arranged about a spring axis, said spring being formed from wire or the like so as to have a circular cross-section, a series of first rollers formed with passages extending centrally therethrough and having outer cylindrical surfaces and end surfaces, said series of first rollers receiving said series of spring coils therethrough in a bead-like threaded manner, each of said first rollers extending around a sufficiently short arc of a coil in relation to the diameter of the coil and the diameter of the first roller passage through which the coil extends that said first rollers are individually freely rotatable on said spring coils, and second rollers also threaded on said coils in a bead-like manner in interspaced relation with said first rollers and having end surfaces and lesser diameter outer cylindrical surfaces than said first rollers, the end surfaces of said first and second rollers which are immediately adjacent each other being in normally slightly spaced relation but engageable therewith, said second rollers providing spacers for said first rollers.

8. A coil spring adapted to be loaded in at least one of tension, compression and torsion load modes and having a series of coils arranged about a spring axis, said spring being formed from wire or the like so as to have a circular cross-section, a series of rollers formed with passages extending centrally therethrough and having outer cylindrical surfaces and end surfaces, said series of rollers receiving said series of spring coils therethrough in a bead-like threaded manner, each of said rollers extending around a sufficiently short arc of a coil in relation to the diameter of the coil and the diameter of the roller passage through which the coil extends that said rollers are individually freely rotatable on said spring coils, said roller outer cylindrical surfaces being crowned so that their maximum diameters are intermediate said roller end surfaces and greater than the diameters of said rollers at said end surfaces.

9. A coil spring adapted to be loaded in at least one of tension, compression and torsion load modes and having a series of coils arranged about a spring axis in a predetermined cross-section configuration, said coil spring being formed from wire or the like so as to have a circular cross-section, said coil spring being adapted to be received on and about a rod member so that said coil spring is guided by the outer surface of said rod member as said coil spring is loaded and unloaded, a plurality of crowned cylinder-like rollers receiving at least some of said spring coils therethrough, said rollers being adapted to engage in rolling relation with the outer surface of said rod member and to individually freely rotate on said circular cross-section coils on which said rollers are mounted to guide said coil spring and to decrease friction between said coil spring and the adjacent outer surface of said rod member as said spring coils and the adjacent rod member outer surface move relatively.

10. A spring, a guide surface area for said spring, said spring being a coil spring having a plurality of coils about the spring axis, said coils being adapted to be loaded in at least one of tension, compression and torsion load modes and when so loaded having said guide surface area operatively engageable by at least a segment of said spring to maintain spring configuration with predetermined limits, said spring segment including at least one of said coils, said spring having a plurality of crowned rollers on said spring segment which are operatively engageable with said guide surface area, said plurality of rollers being located in series on said spring segment and independently rotatable thereon, at least some of said crowned rollers having their outer roller surfaces directly engageable with said guide surface area and being individually rollable on and relative to said spring segment and said guide surface area when said spring coils are so loaded as to cause movement of said spring segment relative to said guide surface area, said rollers thereby decreasing friction between said spring segment and said guide surface area.

* * * * *